C. O. HAWKINS.
STOP VALVE.
APPLICATION FILED JULY 27, 1909.
971,446.
Patented Sept. 27, 1910.
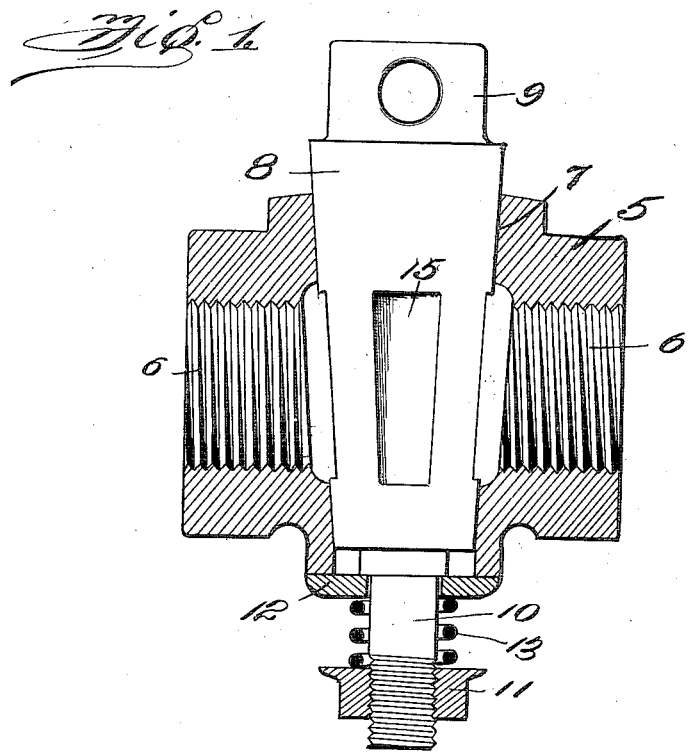
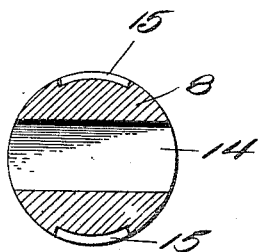

UNITED STATES PATENT OFFICE.

CHARLES O. HAWKINS, OF CHESTERHILL, OHIO.

STOP-VALVE.

971,446. Specification of Letters Patent. Patented Sept. 27, 1910.

Application filed July 27, 1909. Serial No. 509,758.

*To all whom it may concern:*

Be it known that I, CHARLES O. HAWKINS, a citizen of the United States, residing at Chesterhill, in the county of Morgan and State of Ohio, have invented new and useful Improvements in Stop-Valves, of which the following is a specification.

This invention relates to stop valves, and it has particular reference to that class of stop valves which are used on oil pipe lines. In pipe lines for piping oil from the fields to the storage tanks, between the storage tanks and from said tanks numerous stop valves are employed. These valves are usually of large size, and they are usually constructed of cast iron in order to save expense. These valves are not only exposed to rough usage, but they must be capable of being used in various positions, being not always in an upright or vertical position, but oftentimes lying flat on the ground which is frequently wet and muddy, thus making it necessary to employ valves of a very solid construction. Apart from this, the valves are exposed to the corrosive action of brine, a quantity of which is almost invariably mixed with and carried along with the oil. In valves as ordinarily constructed, it has been found that the brine would soon corrode the core of the valve, thus causing a leak and necessitating the installation of a new valve, since not only the core, but the valve casing would be affected. Sediment and scale resulting from corrosion or otherwise would also be carried along with the core every time the valve is manipulated, thus grinding upon the valve casing and hastening the process of deterioration.

The present invention has for its object to overcome the objections above stated and to provide a device of the class referred to which shall possess superior advantages in point of simplicity, durability and general efficiency and with these and other ends in view which will readily appear as the nature of the invention is better understood the same consists in the improved construction and novel arrangement and combination of parts which will be hereinafter fully described and particularly pointed out in the claims.

In the accompanying drawing has been illustrated a simple and preferred form of the invention; it being however understood that no limitation is necessarily made to the precise structural details therein exhibited, but that changes, alterations and modifications within the scope of the invention may be resorted to when desired.

In the drawing: Figure 1 is a sectional elevation of a valve constructed in accordance with the invention. Fig. 2 is a transverse sectional view of the core or plug.

Corresponding parts in both figures of the drawings are designated by like characters of reference.

A valve casing 5 of ordinary construction and having solid side walls is provided with a channel or passage 6 which is screw threaded at both ends as shown in order that connection may conveniently be made with ordinary conduit pipes. If preferred, the valve casing may be in the nature of a faucet, and other well known means may be provided for connecting it with the conduit. The valve casing has a tapering bore 7 for the correspondingly tapered plug or core 8 which is seated upon the said bore; said plug being provided with a handle or a wrench seat 9 which may also serve to indicate the position of the core within the casing. The small end of the core has an axial extension 10 which is screw threaded for the reception of a nut 11. A washer 12 fitted upon the axial stem or extension 10 engages the valve casing as shown and a tension spring 13 is coiled upon the stem 10 between the nut 11 and the washer 12, said spring serving to hold the valve plug or core upon its seat.

The plug or core 8 is provided with the customary port or opening 14 for the passage of liquid. Intermediate the terminals of the passage 14 the sides of the core are provided with recesses 15 located in diametrically opposite relation so as to be exposed to the liquid channel 6 when the core or plug is turned to non-obstructing position as shown in Fig. 1.

Sediment, rust and other obstructive and destructive matter deposited by the liquid or resulting from the corrosive action of the liquid upon the valve and conduit will accumulate in the recesses 15 and will be carried by the latter when the plug is rotated without grinding upon the walls of the bore 7 constituting the seat, thus protecting the parts from injury and greatly lengthening the life of the valve structure. When, as frequently happens in cold weather, brine or the like carried along in the recesses or pockets 15 of the core, freezes in said pockets, the operation of the stop valve will not thereby be interfered with, since the ice thus formed will impinge upon the solid wall of the casing and will be readily carried along with the recesses when the plug or core is turned, and even if the plug should resist turning, a slight tap upon the end of the stem 10 will slightly unseat the core and loosen the same, the said core being instantly reseated by the action of the spring 13, the tension of which may be regulated by the nut 11.

I am aware of the patent to Doolittle, No. 842,183, issued Jan. 29, 1909, in which a cut-off valve is shown comprising a valve plug having a transverse flow passage and provided with recesses in the sides thereof intermediate the ends of said passage, in combination with a casing provided in the side walls thereof with slots which when the plug is open aline with the recesses in the sides of the plug, so that obstructions accumulating in said recesses may be removed. Under this construction, however, a quantity of liquid settling in the recesses of the plug will be permitted to escape through the slots in the sides of the valve casing. This is highly objectionable because stops or cut-offs of this character are usually made of large size and are used in large numbers, for instance, for connecting oil tanks and the like. A waste of say four cubic inches of oil each time one of the stops is opened would amount to a perceptible loss when thousands of these valves or stops are opened and closed from five to six times a day. Such loss is avoided by the construction herein shown and described.

Having thus described the invention, what is claimed is—

1. A stop valve comprising a casing having a liquid passage and a tapering bore, and a plug seated in the bore and having a transverse aperture, said plug being provided with recesses in the walls thereof intermediate the terminals of the aperture, and said recesses being obstructed by a solid portion of the valve casing when the plug is open.

2. A solid valve casing having a liquid passage intersected by a tapering bore, and a core or plug seated upon the bore and having a transverse aperture, said core being provided with recesses formed in the walls thereof in diametrically opposite relation intermediate the ends of the aperture.

3. A stop valve comprising a solid casing having a liquid passage intersected by a tapering bore, and a core or plug seated upon the bore and having a transverse aperture, said core being provided with recesses formed in the walls thereof in diametrically opposite relation intermediate the ends of the aperture, and said core being also provided with a stem projecting through the casing and having a nut threaded thereon; and a spring interposed between the nut and the casing.

In testimony whereof I affix my signature in presence of two witnesses.

CHARLES O. HAWKINS.

Witnesses:
ALLISON B. WRIGHT,
JOHN C. MORREY.